US007860239B2

(12) United States Patent
Cerri et al.

(10) Patent No.: US 7,860,239 B2
(45) Date of Patent: Dec. 28, 2010

(54) METHOD AND APPARATUS FOR METERING USAGE OF SOFTWARE PRODUCTS USING MULTIPLE SIGNATURES

(75) Inventors: Fabio Cerri, Rome (IT); Bernardo Pastorelli, L'Aquila (IT); Giancarlo Carbone, Rome (IT); Francesco Censi, Rome (IT); Calogero Bufalino Marinella, Grotte (IT)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 11/168,693

(22) Filed: Jun. 28, 2005

(65) Prior Publication Data

US 2006/0021061 A1 Jan. 26, 2006

(30) Foreign Application Priority Data

Jul. 7, 2004 (EP) .................................. 04103224

(51) Int. Cl.
*H04N 7/16* (2006.01)
(52) U.S. Cl. .......................... 380/26; 726/26; 713/189; 713/187; 705/52
(58) Field of Classification Search ........................ None
See application file for complete search history.

(56) References Cited

U.S. PATENT DOCUMENTS

| | | | | | |
|---|---|---|---|---|---|
| 5,590,056 | A | * | 12/1996 | Barritz | 702/186 |
| 5,845,065 | A | * | 12/1998 | Conte et al. | 726/31 |
| 5,970,143 | A | * | 10/1999 | Schneier et al. | 713/181 |
| 6,202,924 | B1 | * | 3/2001 | Saunders | 235/379 |
| 6,209,093 | B1 | * | 3/2001 | Venkatesan et al. | 713/176 |
| 6,898,555 | B2 | * | 5/2005 | Levi et al. | 702/186 |
| 6,920,567 | B1 | * | 7/2005 | Doherty et al. | 726/22 |
| 7,089,552 | B2 | * | 8/2006 | Atallah | 717/175 |
| 7,236,610 | B1 | * | 6/2007 | Luo et al. | 382/100 |

(Continued)

FOREIGN PATENT DOCUMENTS

WO WO 9618939 A2 * 6/1996

OTHER PUBLICATIONS

PACE Anti-Piracy, Inc., "InterLok for Windows User Guide", Feb. 2001, http://www.paceap.com/docs/InterLok_for_windows.pdf.*

*Primary Examiner*—William R Korzuch
*Assistant Examiner*—Michael R Vaughan
(74) *Attorney, Agent, or Firm*—Garg Law Firm, PLLC; Rakesh Garg; Jeffrey S. LaBaw

(57) ABSTRACT

A method and a corresponding apparatus for metering usage of software products on a computer are proposed. The solution of the invention is based on the idea of associating each product with an installation signature (indicative of the installation of the product on the computer) and with a running signature (indicative of the running of the product on the computer). The products that are installed on the computer are asynchronously determined according to their installation signatures; in this way, any ambiguities (for example, caused by different versions and/or configurations of a product sharing the same executable modules) can be resolved in advance. Therefore, when at run-time the invocation of an executable module is detected it is possible to use only the running signatures to identify the corresponding product uniquely (without the need of additional information about the executable module, such as its size).

17 Claims, 5 Drawing Sheets

U.S. PATENT DOCUMENTS

| | | | |
|---|---|---|---|
| 7,236,958 B2 * | 6/2007 | Wong et al. | 705/59 |
| 7,529,775 B2 * | 5/2009 | Bluvshteyn et al. | 707/202 |
| 2002/0022971 A1 * | 2/2002 | Tanaka et al. | 705/1 |
| 2002/0083003 A1 * | 6/2002 | Halliday et al. | 705/52 |
| 2002/0107701 A1 * | 8/2002 | Batty et al. | 705/1 |
| 2003/0120923 A1 * | 6/2003 | Gilman et al. | 713/170 |
| 2003/0135474 A1 * | 7/2003 | Circenis et al. | 705/400 |
| 2003/0154168 A1 * | 8/2003 | Lautenbacher | 705/51 |
| 2004/0162989 A1 * | 8/2004 | Kirovski | 713/189 |
| 2004/0243807 A1 * | 12/2004 | Hughes et al. | 713/176 |
| 2004/0268313 A1 * | 12/2004 | Teglia et al. | 717/124 |
| 2005/0091535 A1 * | 4/2005 | Kavalam et al. | 713/201 |
| 2005/0278791 A1 * | 12/2005 | Chu et al. | 726/26 |
| 2006/0026105 A1 * | 2/2006 | Endoh | 705/59 |
| 2006/0059366 A1 * | 3/2006 | Feinleib et al. | 713/187 |

* cited by examiner

METHOD AND APPARATUS FOR METERING USAGE OF SOFTWARE PRODUCTS USING MULTIPLE SIGNATURES

TECHNICAL FIELD

The present invention relates to the data processing field. More specifically, the present invention relates to a method of metering usage of software products on a data processing system. The invention further relates to a computer program for performing the method, and to a product embodying the program. Moreover, the invention also relates to a corresponding apparatus.

BACKGROUND ART

Software products (such as computer programs) can be perfectly reproduced in an infinite number of copies. This is a major concern for publishers of the products wishing to protect their intellectual property rights; indeed, the publishers typically receive a royalty for a licensed use of each product, so that any unaccounted use or distribution of the product results in unpaid royalties. The problem has been exacerbated in the last years by the widespread diffusion of the Internet, which further facilitates the uncontrolled distribution of this kind of products.

The most straightforward way of avoiding unaccounted usage of the products is that of preventing unauthorized copying and transmission. For example, some products embed control code that limits the number of copies that can be made or disables operation of the products after a predetermined period of time has lapsed. Another technique consists of requiring possession of a software or hardware key for running the products. A different solution consists of modifying each product to include a call to a licensing management system. Every time the product is started, a corresponding request is transferred to the licensing management system. The licensing management system verifies whether the usage of the product is authorized. If the result of the verification is positive, the product can continue its execution; otherwise, the product is forced to stop.

However, the technique described above requires each product to be modified by the publisher, so that they are not of general applicability. In addition, the solutions known in the art are quite rigid and cannot be readily adapted to different requirements.

A different approach is based on the use of a software catalogue. The software catalogue lists all the known products to be metered; each product is identified by one or more executable modules indicative of its running. In this case, a licensing agent working in the background detects the executable modules that have been launched; the licensing agent then identifies the corresponding products through the software catalogue.

For this purpose, the licensing agent periodically collects a list of the executable modules that are currently running. For each executable module, if the corresponding product is not authorized the licensing agent may kill the respective process (so as to stop execution of the product), and may make the product unable to start again. Alternatively, as described in WO-A-03038570, the licensing agent detects any new process that is started in response to the request of execution of a product (for example, using a kernel hooking technique). The process is suspended and an authorization to run the product is verified. If the authorization is granted, the process is resumed so as to enable the product to start. Conversely, the process is aborted thereby preventing execution of the product; this avoids killing the product while it is performing potentially risky operations.

A problem of the techniques based on the software catalogue is that different versions of the same product are typically based on executable modules with an identical name. A solution commonly used for allowing the licensing agent to identify the actual version of the product being running is that of defining the executable modules in the software catalogue by means of their name and size.

However, this technique is not completely satisfactory. Indeed, when two or more versions of a product share the same executable module the licensing agent is unable to identify the correct version of the product that is running.

Moreover, in the solution known in the art the licensing agent cannot discriminate different configurations of the products. A typical scenario consists of a product that is available either as a stand-alone program or within a software suite (of course, with substantially different prices). In this case, whenever the licensing agent detects the launch of the corresponding executable module it cannot determine whether the authorization to run the stand-alone program or the authorization to run the software suite is required.

An additional drawback arises when fix packs or patches are applied to the products. This operation typically changes the sizes of the corresponding executable modules. Therefore, the software catalogue must be updated accordingly (in order to allow the licensing agent to continue working correctly). However, the maintenance of the software catalogue is very inefficient and time consuming (especially when the operation must be repeated on multiple computers). The above-mentioned drawback is particular acute in high-dynamic environments, wherein fix packs and patches are routinely distributed.

SUMMARY OF THE INVENTION

The present invention proposes a solution, which is based on the idea of exploiting multiple signatures for identifying the products that are in use.

Particularly, an aspect of the invention proposes a method of metering usage of software products on a data processing system. The method involves associating each product with an installation signature (indicative of the installation of the product on the system) and with a running signature (indicative of the running of the product on the system). The method continues detecting that a product has been launched on the system. The launched product is then identified according to a combination of the installation signature and the running signature.

In this way, the installation signatures can be used to identify the products that are installed on the system with a high degree of accuracy. Moreover, this feature allows resolving any ambiguities in the identification of the products (when they share the same executable modules); for example, it is possible to discriminate different versions and/or configurations of the same product (especially when the product is available either as a stand-alone program or within a software suite).

Moreover, in the solution of the invention the running signatures can be independent of any fix packs or patches (with their identification that is managed through the installation signatures). In this way, most changes in the products do not affect their running signatures; therefore, it is possible to continue using the same running signatures that remain valid without requiring any immediate action (with the installation signatures that can be updated accordingly later on).

This advantage is clearly perceived in high-dynamic environments, wherein fix packs and patches are routinely distributed (even if the use of the invention in any other kind of system is contemplated).

It should be emphasized that the above-mentioned advantages are achieved without introducing any run-time processing overhead.

In an embodiment of the invention, the products installed on the system are at first determined according to the corresponding installation signatures; the launched product is then determined among the installed products according to the corresponding running signature.

This choice strongly increases the performance of the system. Indeed, the operations based on the running signatures that must be performed at run-time are simplified (exploiting the result of the operations based on the installation signatures that can be performed periodically).

Preferably, a global catalogue is provided; for each product, the global catalogue specifies the corresponding installation signature and running signature. A reduced catalogue is extracted from the global catalogue; for each installed product, the reduced catalogue specifies the corresponding running signature. The reduced catalogue is then accessed to identify the launched product.

This implementation significantly reduces the amount of information to be processed at run-time (without impairing the accuracy of the results).

The proposed solution is particularly advantageous when one or more running signatures are associated with a plurality of products.

Indeed, this approach allows resolving any ambiguities (thanks to the identification of the products based on their installation signatures).

A suggested choice for defining each installation signature consists of using an indication of one or more conditions; the corresponding product is then considered installed on the system when each one of the conditions is satisfied.

The devised schema provides a high degree of flexibility; as a result, substantially any kind of product can be identified.

On the other hand, each running signature includes an indication of one or more executable modules; the corresponding product is then considered running on the system when one of the executable modules is invoked.

The proposed approach is very simple, but at the same time effective.

As a further enhancement, each executable module is identified by a corresponding name.

The proposed simplification reduces the operations to be performed at run-time; moreover, this makes the installation signatures completely independent of any characteristics of the executable modules.

A further aspect of the present invention provides a computer program for performing the above-described method.

A still further aspect of the invention provides a program product embodying this program.

Moreover, another aspect of the invention provides a corresponding apparatus for metering usage of software products.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
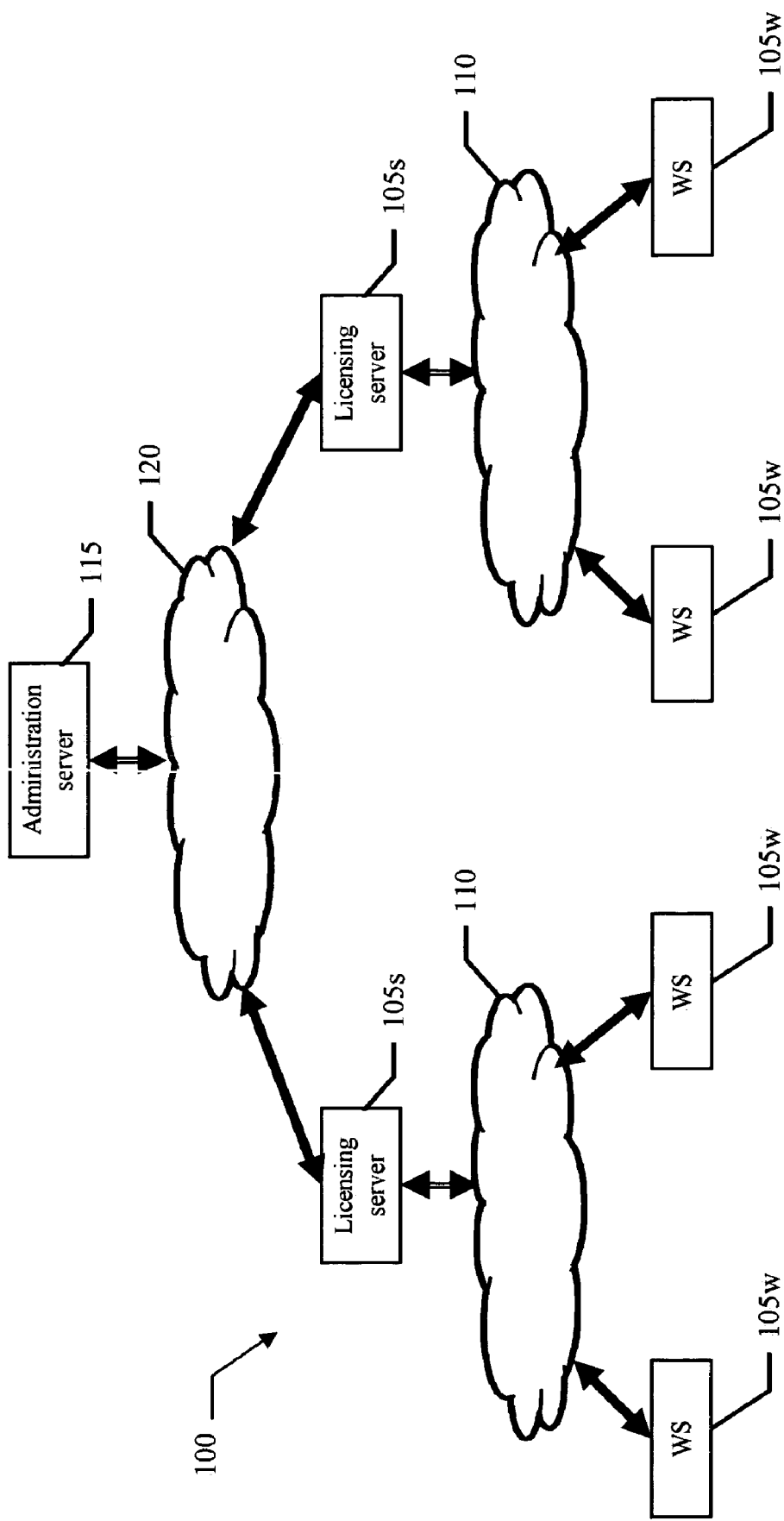
FIG. 1a is a schematic block diagram of a data processing system in which the method of the invention is applicable.

With reference in particular to FIG. 1a, a data processing system 100 with distributed architecture is depicted. The system 100 includes multiple workstations 105w, which are grouped into different sets; a licensing server 105s is associated with the workstations 105w of each set. The licensing server 105s and the corresponding workstations 105w are connected to each other through a network 110 (for example, a LAN). The different licensing servers 105s communicate with a remote administration server 115 through a different network 120 (for example, INTERNET-based); the administration server 115 implements a central repository where usage, procurement and inventory data of the system 100 is collected and managed.

Figure 1B:
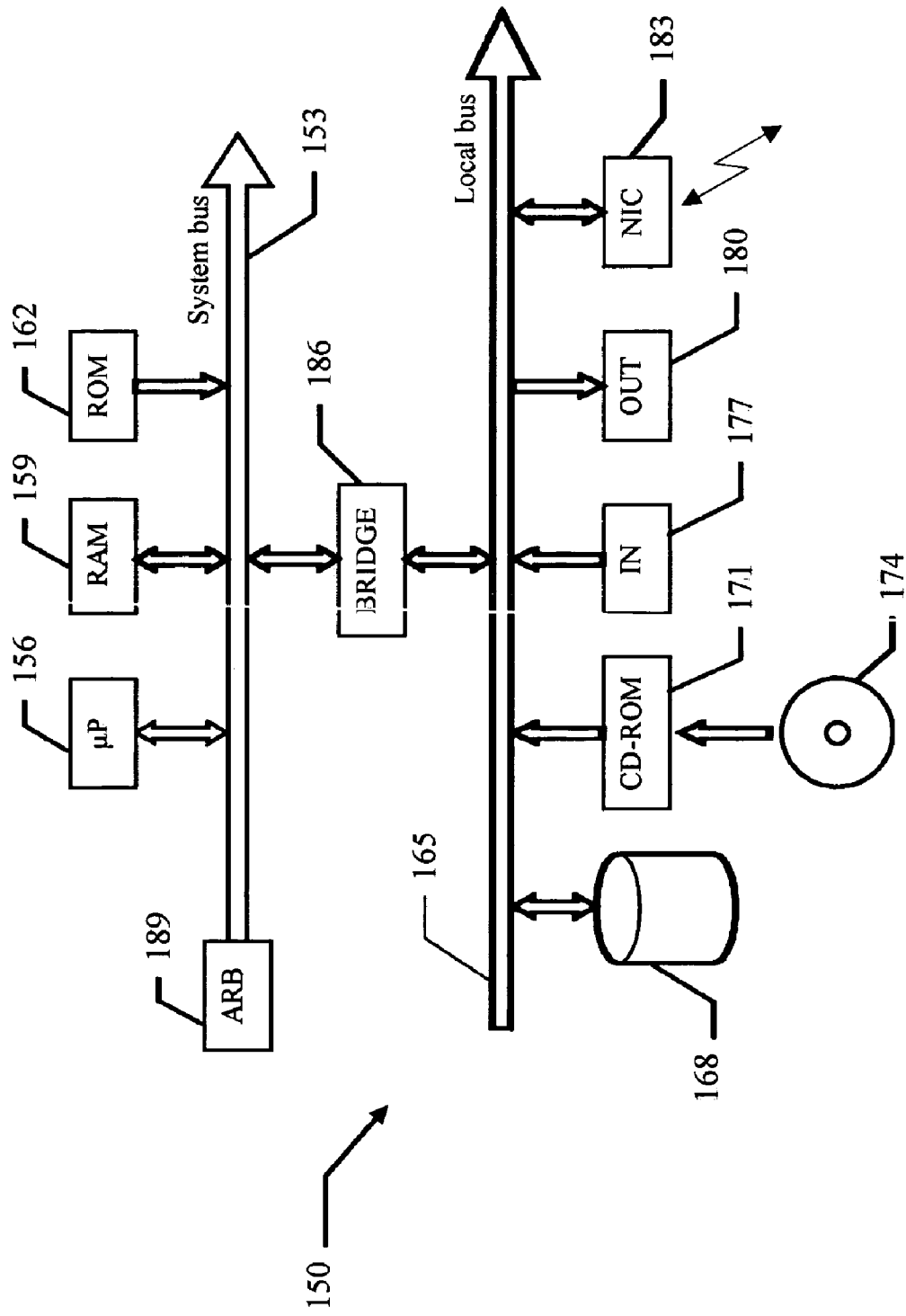
FIG. 1b shows the functional blocks of a generic computer of the system.

As shown in FIG. 1b, a generic computer of the system (workstation, licensing server, or administration server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent united or consist of other data processing entities (such as PDAs, mobile phones, and the like). In any case, the solution of the invention is also suitable to be used in a system wherein the control of the workstations is decentralized, or even in a stand-alone computer.

Figure 2:
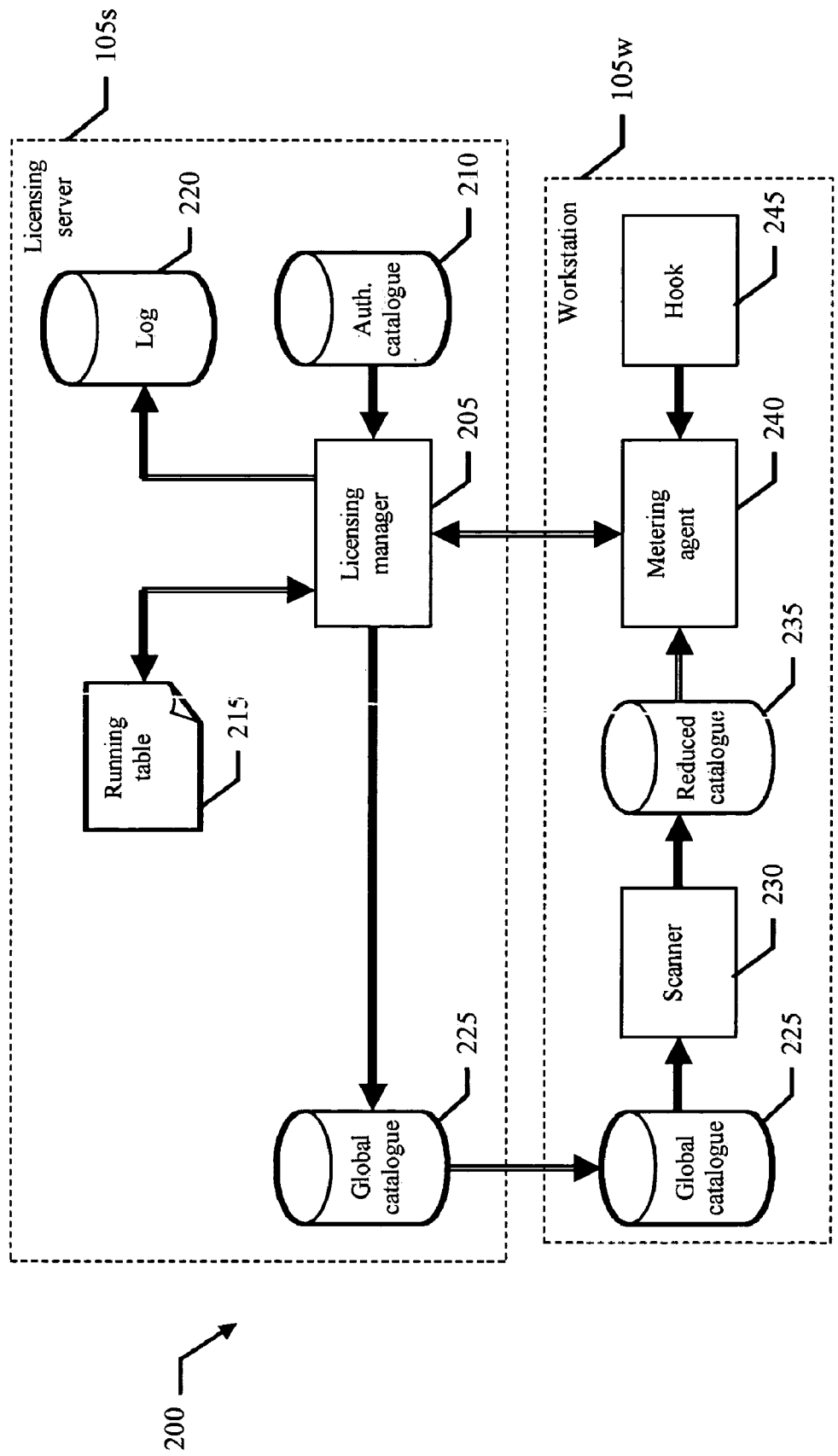
FIG. 2 depicts the main software components that can be used for practicing the method.

Considering now FIG. 2, the main software components that can be used to practice the method of the invention are denoted as a whole with 200. The information (programs and data) is typically stored on the hard-disks of the different computers and loaded (at least partially) into the corresponding working memories when the programs are running. The programs are initially installed onto the hard-disks from CD-ROMs.

Considering in particular a generic licensing server 105s, a corresponding manager 205 controls the associated workstations 105w (only one shown in the figure). The licensing manager 205 accesses an authorisation catalogue 210, which contains information about the authorised conditions of use of different software products; for example, the authorisation catalogue 210 specifies the maximum processing power or the maximum capacity of the working memories of the workstations 105w on which each product can run, the number of licenses for the product (defining the maximum number of instances of the product allowed to run concurrently), and the like. The licensing manager 205 also controls entering of information into a running table 215, which lists the products currently in execution on the workstations 105w. In addition, the licensing manager 205 collects information from the corresponding workstations 105w (for example, about the installed programs, any attempts to run non-authorised or unknown products, and the like); this information is stored into a corresponding log 220.

The licensing server 105s also stores a global software catalogue 225, which is distributed to each workstation 105w. The global catalogue 225 lists all the known products to be metered in the system. Each product is identified by an installation signature and a running signature.

The installation signature is used to identify the products that are installed on the workstation 105w. The installation signature consists of an expression based on one or more conditions in logical AND. For example, a condition can consist of the availability of a generic software module on the workstation 105w (generally defined by its name and size); the module can be an executable file, a dynamic library, a help file, a database, and the like. In addition or in alternative, a condition can consist of a configuration parameter of the workstation 105w (for example, the value of a specific registry key). Moreover, the condition can consist of a specific program to be invoked for analyzing the workstation 105w. In other words, whatever expression (substantially without any constraint) can be used to identify the installation of the corresponding product uniquely (when all the conditions are evaluated to true at the same time).

On the other hand, the running signature is used to identify the products that are running on the workstation 105w. The running signature consists of an expression based on the indication of one or more executable modules in logical OR. Each executable module is defined by its name only (without any additional information, such as the size). The corresponding product is considered running on the workstation 105w when any one the executable modules is invoked. It should be emphasized that it is not mandatory for each executable module to be uniquely associated with a single product; in other words, the same running signature (or a part thereof) can identity two or more different products.

An exemplary content of the global catalogue 225 is illustrated in the following table:

| Product | Installation signature | Running signature |
| --- | --- | --- |
| Pr1v1 | Md1 AND Ky1 | Ex1 |
| Pr1v2 | Md1 AND Ky2 | Ex1 |
| Pr2 | Md2, Sz2 | Ex2 |
| Pr3 | Md3, Sz3 | Ex3 |
| Pr4 | Md4, Sz4 | Ex4 |
| St1 | Hl1, Sz1 AND Tx1 | Ex2 OR Ex3 OR Ex4 |

Particularly, the global catalogue includes two different versions ("Pr1v1" and "Pr2v2") of the same product. The installation of the version "Pr1v1" is defined by the module "Md1" and the configuration parameter "Ky1", while the installation of the version "Pr1v2" is defined by the same module "Md1" and the configuration parameter "Ky2"; the running of both the versions "Pr1v1" and "Pr2v2" is defined by the executable module "Ex1". Moreover, the installation of the products "Pr2", "Pr3" and "Pr4" is defined by the module "Md2" with size "Sz2", the module "Md3" with size "Sz3", and the module "Md4" with size "Sz4", respectively; likewise, the running of the products "Pr2", "Pr3" and "Pr4" is defined by the executable modules "Ex2", "Ex3" and "Ex4", respectively. The global catalogue 225 also includes a suite "St1" (which is composed of the above-described products "Pr2", "Pr3" and "Pr4"). The installation of the suit "St1" is defined by the module "Hl1" with size "Sz1" and the module "Tx1"; the running of the suite "St1" is instead defined by any one of the executable modules "Ex2", "Ex3" and "Ex4" (of its component products).

The global catalogue 225 is accessed by a scanner 230. The scanner 230 uses the installation signatures listed in the global catalogue 225 to determine the products that are installed on the workstation 105w. As a result, the scanner 230 generates a reduced catalogue 235. The reduced catalogue 235 is extracted from the global catalogue 225 by listing the installed products only; for each installed product, the reduced catalogue 235 specifies the corresponding running signature (without the installation signature).

This process allows resolving any ambiguities in the running signatures (when the same executable module identifies multiple products in the global catalogue 225). Particularly, if a single version and/or configuration of each product is installed on the workstation 105w, the ambiguities are resolved automatically. Conversely, this is not possible when the same product is installed in different versions or when both a stand-alone program and the corresponding suite are available; in those cases, the scanner 230 selects the most valuable hypothesis (i.e., the latest version of the product or the suite).

For example, assuming that only the products "Pr1v1" and "Pr3" are installed on the workstation 105w, the following reduced catalogue 235 is extracted from the above-described global catalogue 225:

| Product | Running signature |
| --- | --- |
| Pr1v1 | Ex1 |
| Pr3 | Ex3 |

Conversely, when the products "Pr1v2" and "St1" are installed on the workstation 105w the following reduced catalogue 235 is obtained:

| Product | Running signature |
| --- | --- |
| Pr1v2 | Ex1 |
| St1 | Ex2 OR Ex3 OR Ex4 |

In both cases, each executable module now identifies a corresponding product uniquely (without any ambiguity).

The reduced catalogue 235 is accessed by a metering agent 240 running in the background. The metering agent 240 also interfaces with a hook module 245. The hook 245 is implemented by means of a kernel extension, which adds functionality to an operating system of the workstation 105w using publicly available, standard interfaces. The hook 245 intercepts the starting of any new process on the workstation 105w, and reports the name of the corresponding executable module that has been invoked to the metering agent 240. The metering agent 240 uses the running signatures listed in the reduced catalogue 235 to determine the product (corresponding to the invoked executable module) that has been launched; if the executable module is not included in the reduced catalogue 235, the product is considered unknown. The name of the product being launched (or an indication that it is unknown) is then transmitted to the licensing manager 205. The licensing manager 205 grants or denies the authorization to run the product (using the authorization catalogue 210 and the running table 215). The result of the process is stored into the log 220 and it is returned to the metering agent 240 (updating the running table 215 if necessary); the metering agent 240 then resumes or aborts the corresponding process accordingly.

Similar considerations apply if the programs and data are structured in a different manner, if other modules or functions are provided, or if the information is stored in equivalent memory structures. In any case, the solution of the invention is also suitable to be implemented with a licensing manager that controls the authorisations to run the products directly on each workstation.

Figure 3A:
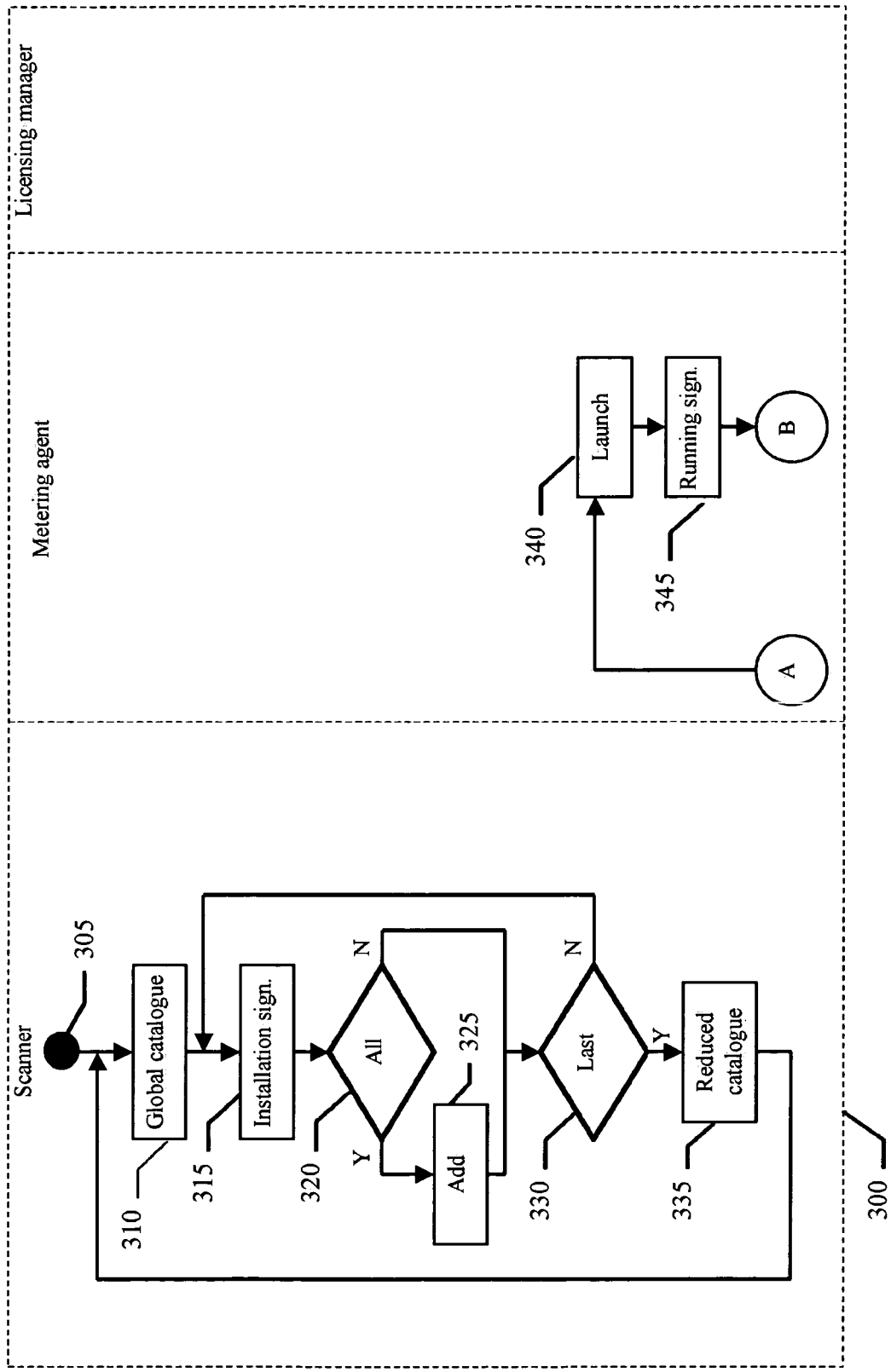
FIGS. 3a-3b show a diagram describing the flow of activities relating to an illustrative implementation of the method.
Figure 3B:
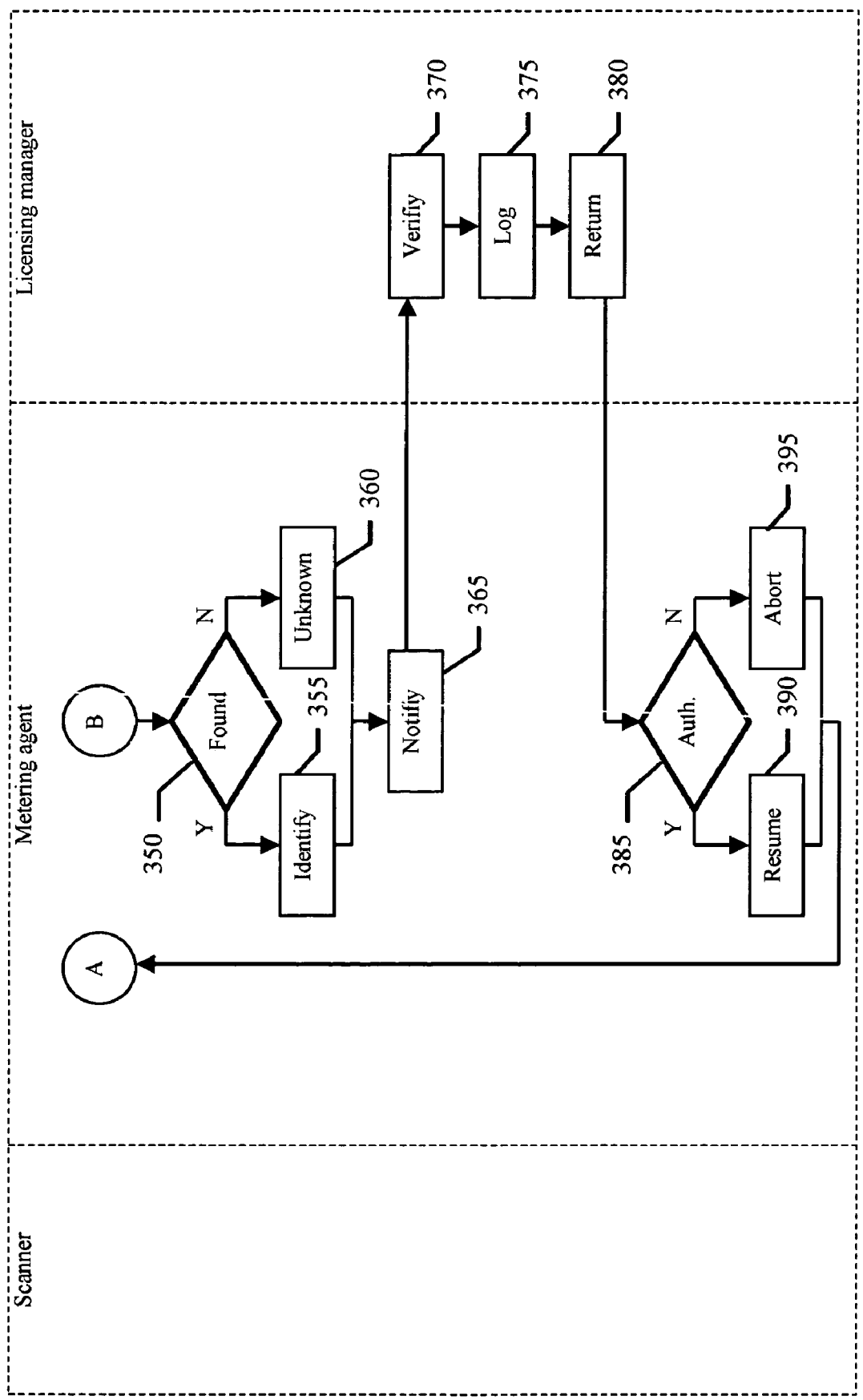

Considering now FIGS. 3a-3b, the logic flow of a metering process according to an embodiment of the invention is represented with a method 300. The method begins at the black start circle 305 in the swim-lane of the scanner. Continuing to block 310, a scanning procedure of the workstation is initialized by loading the global catalogue; this procedure is performed whenever a new global catalogue is downloaded from the licensing server, a product is installed/removed, or a predetermined time-out expires (for example, every day).

The method passes to block 315, wherein a current installation signature extracted from the global catalogue is analyzed (starting from the first one). A test is then made at block 320 to determine whether the expression defining the installation signature is asserted (i.e., all the corresponding conditions are satisfied). If so, at block 325 the name of the product and the corresponding running signature are added to the reduced catalogue (being flushed at the beginning of the scanning procedure); the method then continues to block 330. Conversely, when one or more conditions of the installation signature are not satisfied the method descends into block 330 directly.

Considering now decision block 330, if the processing of the global catalogue has not been completed, the method returns to block 315 to repeat the same operations for a next installation signature. Conversely, the flow of activity proceeds to block 335, wherein the reduced catalogue so obtained is stored onto the workstation (and it is transmitted to the licensing manager for its logging at the same time). The process then returns to block 310, waiting for the occurrence of one of the above-mentioned events.

Concurrently (in a completely asynchronous manner), the metering agent loops at block 340 waiting for the launch of a product. Whenever the hook detects and reports the invocation of an executable module, the flow of activity descends into block 345 (with the corresponding process that is suspended); in response thereto, the metering agent looks for the executable module in the reduced catalogue. The method then branches at decision block 350 according to the result of the operation. If the executable module asserts a running signature listed in the reduced catalogue, the corresponding product is identified at block 355; conversely, when the executable module is not included in the reduced catalogue the product is set as unknown at block 360. In both cases, the event is notified to the licensing manager at block 365; particularly, the metering agent submits a request for execution of the product (including configuration information defining its execution environment, such as the processing power or the working memory capacity of the workstation) or transmits a message indicating that the product is unknown.

In response thereto, the licensing manager at block 370 verifies whether the execution of the product on the workstation would comply with the conditions of use stored in the authorisation catalogue (for example, whether the execution environment meets the authorised configuration and the number of instances of the product already running does not reach the maximum allowable value); conversely, any unknown product is deemed non-authorized by default (or an administrator is prompted to define its authorization at run-time). The result of the verification is logged at block 375; at the same time, if the authorisation has been granted the product is also added to the running table. In this phase, it is further possible to notify any critical condition to the administrator (for example, when the number of available licenses for the product falls below a threshold value or when the licensing server has run out of licenses for the product). A corresponding response is then returned to the metering agent at block 380.

The flow of activity now branches at decision block 385 (in the swim-lane of the metering agent) according to whether the authorisation to run the product has been granted or denied. If the authorisation has been granted, the metering agent resumes the process associated with the executable module at block 390, in order to enable the corresponding product to start its execution; conversely, if the authorisation to run has been denied the metering agent aborts the process at block 395, so as to prevent starting of the product. In both cases, the flow of activity returns to block 340 waiting for the launch of another product.

Similar considerations apply if the method includes equivalent or additional steps. For example, although not descried in detail in order to avoid obscuring the description of the invention with unnecessary details, it is obvious that a procedure is also provided for notifying the licensing manager when the execution of a product is terminated (so as to delete the product from the running table and then release the respective license). In addition, it is possible to have each workstation send a heartbeat message to the licensing manager periodically (for example, every ten minutes); in this way, the products running on the workstation can be deleted from the running table (in order to release the respective licenses) if the heartbeat message is not received within a predefined period (meaning that the workstation is not working correctly). Moreover, the administration server periodically collects the information logged on the different licensing servers, in order to create different reports (for example, relating to the installation and/or usage of the products on the workstations).

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

For example, the use of the proposed solution in a context different than the licensing management is contemplated. Particularly, the information that has been detected about the products can be used for reporting purposes only (without any verification of their authorizations). Alternatively, the products are always allowed to run (for example, only logging an exception when their use is not authorized).

In any case, the method of the invention can be used to meter any kind of software products (such as a video games, multimedia works, and the like); moreover, the launch of the products can be detected in another way (for example, periodically collecting a list of the executable modules that are running).

Alternatively, the installation signatures can be based on other conditions (even requiring a user intervention for their evaluation).

In addition, the programs can be distributed on any other computer readable medium (such as one or more DVDs); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

Particularly, the launched product can be identified according to any combination of the installation signature and the running signature. For example, it is possible to use the running signature as usual and refer to the installation signature only when an ambiguity is detected.

Moreover, the use of a single software catalogue (or any equivalent structure) is not excluded; for example, it is possible to flag the installed products in the global catalog (without extracting any reduced catalogue).

In any case, the use of the proposed solution in applications wherein each running signature uniquely identifies a corresponding product is not excluded.

Alternatively, the installation signatures and/or the running signatures can be defined by different expressions (even using more complex logical operators); moreover, it is not excluded the possibility of identifying the executable modules with other properties (in substitution or in addition to their names).

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for metering usage of a software product on a data processing system, comprising:
    associating an installation signature with the software product, the installation signature uniquely identifying the software product on the data processing system when the software product is installed on the data processing system;
    associating a running signature with the software product, the running signature identifying the software product on the data processing system when the software product is running on the data processing system, the running signature of the software product being distinct from the installation signature of the software product;
    detecting a launch of the software product on the data processing system;
    providing a global catalogue, the global catalogue specifying for each software product in a group of software products a corresponding installation signature and a corresponding running signature;
    extracting a reduced catalogue from the global catalogue, the reduced catalogue including only a group of running signatures corresponding to the group of installed software products;
    accessing the reduced catalogue to identify the software product;
    identifying the software product using (i) the installation signature and (ii) the running signature; and
    using the identified installation signature and running signature to meter usage of the software product.

2. The method according to claim 1, wherein the step of identifying the launched software product further comprises:
    determining a group of installed software products on the data processing system by determining a group of installation signatures present on the data processing system; and
    identifying the software product using the running signature, the running signature uniquely identifying the software product in the group of installed products.

3. The method according to claim 1, wherein the running signature is associated with more than one software products.

4. The method according to claim 1, wherein the installation signature includes at least one condition, the software product being considered installed on the data processing system when each one of the at least one condition is satisfied, and wherein the at least one condition is one of (i) availability of a generic software module on the data processing system, (ii) a configuration parameter of the data processing system, and (iii) a specific program to be invoked for analysing the data processing system.

5. The method according to claim 1, wherein the running signature includes an indication of at least one executable module associated with the software product, the software product being considered running on the data processing system when one of the at least one executable module is invoked.

6. The method according to claim 5, wherein the indication of the at least one executable module in the running signature is identifying the at least one executable module by a name, and wherein the at least one executable module is associated with more than one software products.

7. The method according to claim 1, wherein the installation signature is determined after the software product has been installed on the data processing system.

8. A computer usable program product comprising a non-transitory computer usable storage medium including computer usable code for metering usage of a software product on a data processing system, the computer usable code comprising:
    computer usable code for associating an installation signature with the software product, the installation signature uniquely identifying the software product on the data processing system when the software product is installed on the data processing system;
    computer usable code for associating a running signature with the software product, the running signature identifying the software product on the data processing system when the software product is running on the data processing system, the running signature of the software product being distinct from the installation signature of the software product;
    computer usable code for detecting a launch of the software product on the data processing system;
    computer usable code for providing a global catalogue, the global catalogue specifying for each software product in a group of software products a corresponding installation signature and a corresponding running signature;

computer usable code for extracting a reduced catalogue from the global catalogue, the reduced catalogue including only a group of running signatures corresponding to the group of installed software products;

computer usable code for accessing the reduced catalogue to identify the software product;

computer usable code for identifying the software product using (i) the installation signature and (ii) the running signature; and computer usable code for using the identified installation signature and running signature to meter usage of the software product.

9. The computer usable program product according to claim 8, wherein the computer usable code for identifying the launched software product further comprises:

computer usable code for determining a group of installed software products on the data processing system by determining a group of installation signatures present on the data processing system; and computer usable code for identifying the software product using the running signature, the running signature uniquely identifying the software product in the group of installed products.

10. The computer usable program product according to claim 8, wherein the running signature is associated with more than one software products.

11. The computer usable program product according to claim 8, wherein the installation signature includes at least one condition, the software product being considered installed on the data processing system when each one of the at least one condition is satisfied, and wherein the at least one condition is one of (i) availability of a generic software module on the data processing system, (ii) a configuration parameter of the data processing system, and (iii) a specific program to be invoked for analysing the data processing system.

12. The computer usable program product according to claim 8, wherein the running signature includes an indication of at least one executable module associated with the software product, the software product being considered running on the data processing system when one of the at least one executable module is invoked, wherein the indication of the at least one executable module in the running signature is identifying the at least one executable module by a name, and wherein the at least one executable module is associated with more than one software products.

13. The computer program product of claim 8, wherein the computer usable code is stored in a computer readable storage medium in a data processing system, and wherein the computer usable code is transferred over a network from a remote data processing system.

14. The computer program product of claim 8, wherein the computer usable code is stored in a computer readable storage medium in a server data processing system, and wherein the computer usable code is downloaded over a network to a remote data processing system for use in a computer readable storage medium associated with the remote data processing system.

15. An apparatus for metering usage of a software product on a data processing system, the apparatus comprising:

a storage device including a storage medium, wherein the storage device stores computer usable program code; and a processor, wherein the processor executes the computer usable program code, and wherein the computer usable program code comprises:

computer usable code for associating an installation signature with the software product, the installation signature uniquely identifying the software product on the data processing system when the software product is installed on the data processing system;

computer usable code for associating a running signature with the software product, the running signature identifying the software product on the data processing system when the software product is running on the data processing system, the running signature of the software product being distinct from the installation signature of the software product;

computer usable code for detecting a launch of the software product on the data processing system;

computer usable code for providing a global catalogue, the global catalogue specifying for each software product in a group of software products a corresponding installation signature and a corresponding running signature;

computer usable code for extracting a reduced catalogue from the global catalogue, the reduced catalogue including only a group of running signatures corresponding to the group of installed software products;

computer usable code for accessing the reduced catalogue to identify the software product;

computer usable code for identifying the software product using (i) the installation signature and (ii) the running signature; and computer usable code for using the identified installation signature and running signature to meter usage of the software product.

16. The apparatus according to claim 15, wherein the installation signature includes at least one condition, the software product being considered installed on the data processing system when each one of the at least one condition is satisfied, and wherein the at least one condition is one of (i) availability of a generic software module on the data processing system, (ii) a configuration parameter of the data processing system, and (iii) a specific program to be invoked for analysing the data processing system.

17. The apparatus according to claim 15, wherein the running signature includes an indication of at least one executable module associated with the software product, the software product being considered running on the data processing system when one of the at least one executable module is invoked, wherein the indication of the at least one executable module in the running signature is identifying the at least one executable module by a name, and wherein the at least one executable module is associated with more than one software products.

\* \* \* \* \*